(12) United States Patent
Jun

(10) Patent No.: US 6,229,560 B1
(45) Date of Patent: May 8, 2001

(54) METHOD OF AND APPARATUS FOR DETERMINING CO-CHANNEL INTERFERENCE IN DIGITAL TELEVISION SYSTEM

(75) Inventor: Jungsig Jun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/207,263

(22) Filed: Dec. 9, 1998

(30) Foreign Application Priority Data

Dec. 16, 1997 (KR) .................................................. 97-69288

(51) Int. Cl.[7] ...................................................... H04N 5/21
(52) U.S. Cl. ............................ 348/21; 348/607; 348/608; 348/614; 348/725; 348/723; 375/346
(58) Field of Search ............................... 348/21, 426, 470, 348/607, 608, 614, 725, 723, 729; 375/346, 348, 349, 350; H04N 5/21, 5/38

(56) References Cited

U.S. PATENT DOCUMENTS

| 5,546,132 | * | 8/1996 | Kim et al. | 348/607 |
| 5,602,602 | * | 2/1997 | Hulyalkar | 348/607 |
| 5,793,417 | * | 8/1998 | Lee | 348/21 |
| 5,801,759 | * | 9/1998 | Limberg | 348/21 |
| 5,821,988 | * | 10/1998 | Citta et al. | 348/21 |
| 5,835,131 | * | 11/1998 | Limberg | 348/21 |
| 5,877,816 | * | 3/1999 | Kim | 348/526 |
| 6,023,306 | * | 2/2000 | Limberg | 348/726 |
| 6,057,877 | * | 5/2000 | Limberg | 348/21 |

* cited by examiner

Primary Examiner—Reinhard Eisenzopf
Assistant Examiner—Jean W. Désir
(74) Attorney, Agent, or Firm—Birch, Stewart, Kolasch & Birch, LLP

(57) ABSTRACT

An apparatus and method for determining co-channel interference in a DTV system is disclosed including a first comb filter filtering the received digital data including a data field signal; a pattern generating unit generating a reference sync signal from the data field signal; a second comb filter filtering the reference sync signal; a selection unit receiving either the digital data that passed or have not passed the first comb filter to output one of the data in response to a selection signal; a determination unit determining the presence of a co-channel interference; a first counting unit counting up/down a counted value in response to an output signal of the determination unit; and a second counting unit counting the reliability of the counted value output from the first counting unit, and providing the selection signal to the selection unit.

14 Claims, 3 Drawing Sheets

METHOD OF AND APPARATUS FOR DETERMINING CO-CHANNEL INTERFERENCE IN DIGITAL TELEVISION SYSTEM

BACKGROUND OF THE INVENTION

1. Field of the Invention

The present invention relates to a digital television system (DTV) and more particularly to determining co-channel interference in the DTV employing a vestigial sideband (VSB) transmission system.

2. Discussion of Related Art

According the digital television broadcasting standardized by the Grand Alliance (GA), both the digital and NTSC television systems use radio frequency (RF) signals. Also, each channel band of the digital and NTSC television system is limited to 6 MHz. However, a significant difference between the digital and NTSC television system is in the transmission spectrum of the broadcasting.

In the transmission spectrum of the NTSC system, a large video carrier frequency is always 1.25 MHz above the low end of a channel, a chrominance subcarrier frequency is 3.5 MHz above a video carrier signal, and a sound carrier signal has an unmodulated center frequency of 4.5 MHz higher than a video carrier frequency for the same channel. In contrast, the transmission spectrum of the DTV system only has a very small pilot carrier signal with an unmodulated center frequency of 0.31 MHz to assist the carrier recovery at the receiver.

Moreover, DTV signals are coded and transmitted in a different manner from the coding and transmission methods of the analog signals for NTSC system. Thus, a viewer generally cannot watch a NTSC broadcast with the DTV system. Nevertheless, a same tuner may be used since the DTV and NTSC system both use the same RF channel and the same intermediate frequency (IF) band. The DTV signal and the conventional analog NTSC television signal use the same RF channel and the NTSC system uses a portion of the channel designated as a taboo channel to prevent channel interference. Thus, the DTV and NTSC system may share an antenna and a tuner.

However, co-channel interference may occur in the DTV broadcast, when an NTSC broadcasting is utilizing the co-channel during the DTV broadcasting. The carrier powers, namely the video carriers, the chrominance subcarrier, and the sound carrier, of the NTSC system are significantly larger than the pilot signal of the DTV system, resulting in severe interference in the DTV broadcast. Generally, a comb filter is used to remove co-channel NTSC interference.

The comb filter consists of delays and subtracters. Each delay consists of 12 resistors connected in series and delays the received signal for 12 symbols to obtain the transmission characteristics suitable for filtering. The comb filter also subtracts the delayed data for 12 symbols from the current data. The carrier powers of the NTSC system are removed by the comb filter by converging to "0" (zero). Specifically, the video carrier, chrominance carrier, and sound carrier of the NTSC system are around the null point when passing the comb filter, thereby avoiding interference with the DTV system.

Using a comb filter also increases the power of the random noise resulting in a deterioration of the picture quality. However, because the deterioration of the picture quality is insignificant compared to the effect of removing the NTSC channel interference, using a comb filter is still preferable. Furthermore, since the co-channel NTSC interference does not always exist, the comb filter is used when a co-channel NTSC interference occurs in the DTV system.

FIG. 1 is a block diagram of the DTV system. When RF signals modulated according to the VSB system are received through an antenna 100, a tuner 110 selects a desired channel frequency by tuning and converts the frequency into an IF signal. A frequency-phase locking loop (FPLL) 120 demodulates the IF signal from the tuner 110 into baseband signals I and Q to lock the output phase and frequency. The FPLL 120 is a circuit unifying both a frequency tracking loop and a phase-locking loop, but the frequency is locked prior to the phase.

An analog/digital (A/D) converter 130 converts the I signal into digital data of a given bit number (for example, 10 bits). The Q signal is used for carrier restoration within the FPLL 120. Using the converted digital data of a given bit number, a synchronization recovery unit 140 recovers a synchronization signal inserted at the time of transmission to be used for timing recovery and equalization.

The standardized VSB transmission signal includes a specific synchronization (sync) signal pattern within the transmitted data which allows a receiver to easily recover the sync signals. Accordingly, the data incorporates consecutive data segments, wherein each segment consists of 832 symbol units and within the 832 symbol units, four symbols define the segment sync signal pattern while the other 828 symbols are data information. Also, a field consists of 313 data segments and at every 313th data segment position, a field sync signal is inserted. The segment and field sync signals are similar to a horizontal and vertical sync signals of the NTSC broadcasting signals, respectively. Because the sync signals allow an easy data recovery, erroneous detection and recovery of the sync signals adversely affects the overall system.

An equalization & error coding correction (ECC) unit 150 uses the data segment and data field signals as training signals. An equalization is performed to correct linear distortion of amplitude causing interference between symbols, ghost images, etc. Afterwards, an ECC is performed to correct errors that may have occurred during transmission through the channel. A video decoder 160 decodes the equalized and error corrected signal according to the moving picture expert group (MPEG) algorithm, allowing the TV audience to watch a broadcast through display 170.

Before the sync recovery unit 140 outputs the recovered sync signals to the equalization & ECC unit 150, a determination unit 190 determines whether co-channel NTSC interference exists. If co-channel NTSC interference does not exist, the data bypasses a comb filter 180 and is output to the equalization & ECC unit 150. If co-channel NTSC interference is determined to exist, the data passes through the comb filter 180 and is output to the equalization & ECC unit 190. The determination unit 190 controls whether the data passes or bypasses the comb filter 180 by sending a selection signal to a selection unit 200 which outputs a comb filtered data if the selection signal is received and outputs the data directly otherwise.

The DTV and NTSC broadcasting systems transmit data through space and may be significantly attenuated by various noise in space. The noise which is picked up by a channel during transmission is a Gaussian noise. The power of the Gaussian noise is generally constant, but may sometimes surge instantaneously to a large value. In such cases, the Gaussian noise may be determined to be co-channel NTSC interference causing the data to pass through the comb filter 180 before being output to the equalization and error code correction unit 150.

Particularly, in a zone where the DTV and NTSC broadcasting system overlap, a common-channel interference such as the Gaussian noise or a co-channel NTSC interference may occur. When a noise which passes through and which does not pass through the comb filter 180 have a similar size, the corresponding data which passes or does not pass through the comb filter 180 may be incorrectly selected and output, this adversely affects the operation of equalization & ECC unit 150. Therefore, circuits removing noisy signals contained in the incoming digital signals are affected causing a malfunction of the DTV receiver.

OBJECTIVES OF THE INVENTION

Accordingly, an object of the present invention is to solve at least the problems and disadvantages of the related art.

An object of the present invention is to provide a DTV system with a constant Gaussian noise.

Another object of the present invention is to provide a DTV system having comb filters which correctly outputs signals regardless of the noise size.

Additional advantages, objects, and features of the invention will be set forth in unit in the description which follows and in unit will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the determination of co-channel interference in DTV system according to the present invention includes a first comb filter filtering the received digital data with a data field signal; a pattern generating unit generating a reference data field signal from the data field signal; a second comb filter filtering the reference data field signal; a selection unit receiving digital data that passed the first comb filter and digital data that has not passed the first comb filter, and outputting the appropriate data in response to a selection signal; a determination unit comparing a mean square error of the comb filtered data field and reference data field signals with a mean square error of the data field and reference data field signals that have not passed a comb filter, and determining co-channel interference; a first counting unit counting up/down a counted value in response to an output signal of the determination part; and a second counting unit counting the reliability of the counted value output from the first counting unit, and providing the selection signal to the selection unit.

According to another embodiment of the present invention, an apparatus for determining co-channel interference in a DTV system includes a first comb filter removing co-channel interference from the received digital data with a data field signal; a pattern generating unit finding a reference data field signal by producing a pattern of the data field signal; a second comb filter making a reference comb filtered signal from the reference data field signal; a selection unit selectively outputting digital data that has or has not passed a comb filter in response to a selection signal; a determination unit comparing a mean square error of the data field and reference data field signal that have not passed a comb filter with a mean square error of the filtered data field and reference data field signal, and determining if there is co-channel interference; a first counting unit counting up or down for predetermined symbols of the data field signal in response to an output of the determination unit, and producing the most significant bit from the output value; and a second counting unit counting the reliability of the output value of the first counting unit, and if the counted reliability has a maximum value, sending a selection signal selecting the comb filtered data to the selection unit, and if the counted reliability has a minimum value, sending a selection signal selecting data that has not passed a comb filter.

According to still another embodiment of the present invention, a DTV system includes an antenna; a tuner selecting a signal of desired channel by tuning when high frequency signals are received through the antenna, and changing an IF signal of the selected signal; a frequency-phase locked loop demodulating the intermediate frequency signal output from the tuner into baseband signals I and Q and locking output frequency and phase; an A/D converting unit converting the I signal into a digital signal of a given bit number; a sync recovery unit detecting sync signals from the digital data output by the A/D converting unit; a first comb filter removing co-channel interference from data applied after recovering sync signals in the sync recovery unit; a second comb filter making a reference comb filtered signal from the reference data field signal; a selection unit selectively producing a comb filtered data if there is co-channel interference, and selectively producing data that has not passed the first comb filter if there is no co-channel interference in response to a selection signal; a determination unit finding a difference between the mean square errors of noise corresponding to the data field signal and the reference data field signal that have not passed a comb filter, and a difference between the mean square errors of noise corresponding to the comb filtered data field signal and the reference data field signal, and comparing the mean square errors to determining if there is co-channel interference and producing a signal in response to a result of the determination; a first counting unit counting up or down for given symbols of the data field signal section in response to the output signal of the determination unit, and outputting only the most significant bit from the output; a second counting unit counting the reliability in response to an output of the first counting unit, producing the selection signal selecting the comb filtered to the selection unit when the reliability has a maximum value, and producing the selection signal for selecting data that has not passed the first comb filter to the selection unit when the reliability has a minimum value; a decoding unit decoding data output through the selection unit by using sync signals detected from the sync recovery unit; and a display visually presenting the decoded data.

According to still another embodiment of the present invention, a method of determining co-channel interference in a DTV system with first and second comb filters, includes the steps of filtering digital data including a data field signal through the first comb filter to remove co-channel interference; finding a reference data field signal by filtering the data field signal through the second comb filter to make a reference comb filtered signal from the reference data field signal; finding a difference between the mean square errors of noise corresponding to the data field signal and the reference data field signal that have not passed a comb filter, and a difference between the mean square errors of noise corresponding to the comb filtered data field signal and the reference data field signal; and comparing the mean square errors to determining if there is co-channel interference.

BRIEF DESCRIPTION OF THE ATTACHED DRAWINGS

The invention will be described in detail with reference to the following drawings in which like reference numerals refer to like elements wherein.

DETAILED DESCRIPTION OF PREFERRED EMBODIMENT

Reference will now be made in detail to the preferred embodiment of the present invention, examples of which are illustrated in the accompanying drawings.

Figure 1:
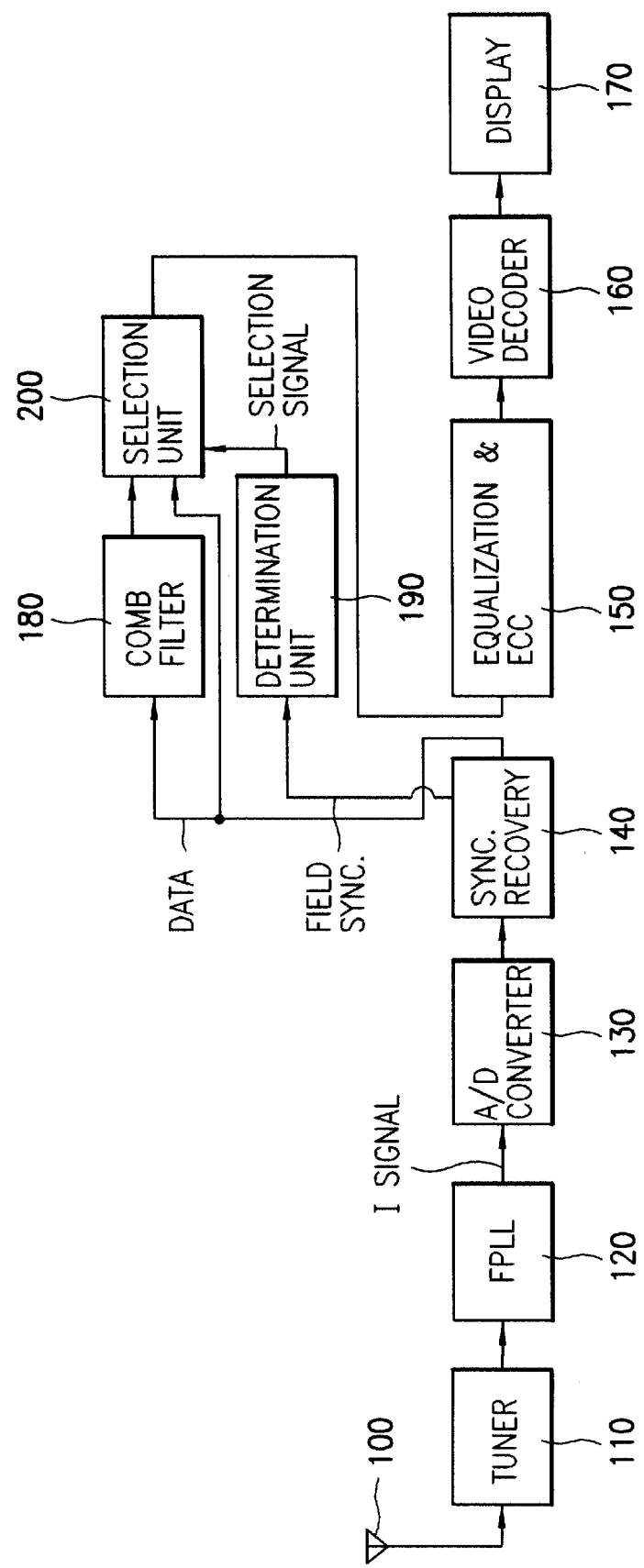
FIG. 1 is a block diagram of a DTV system for determining co-channel interference in the related art.
Figure 2:
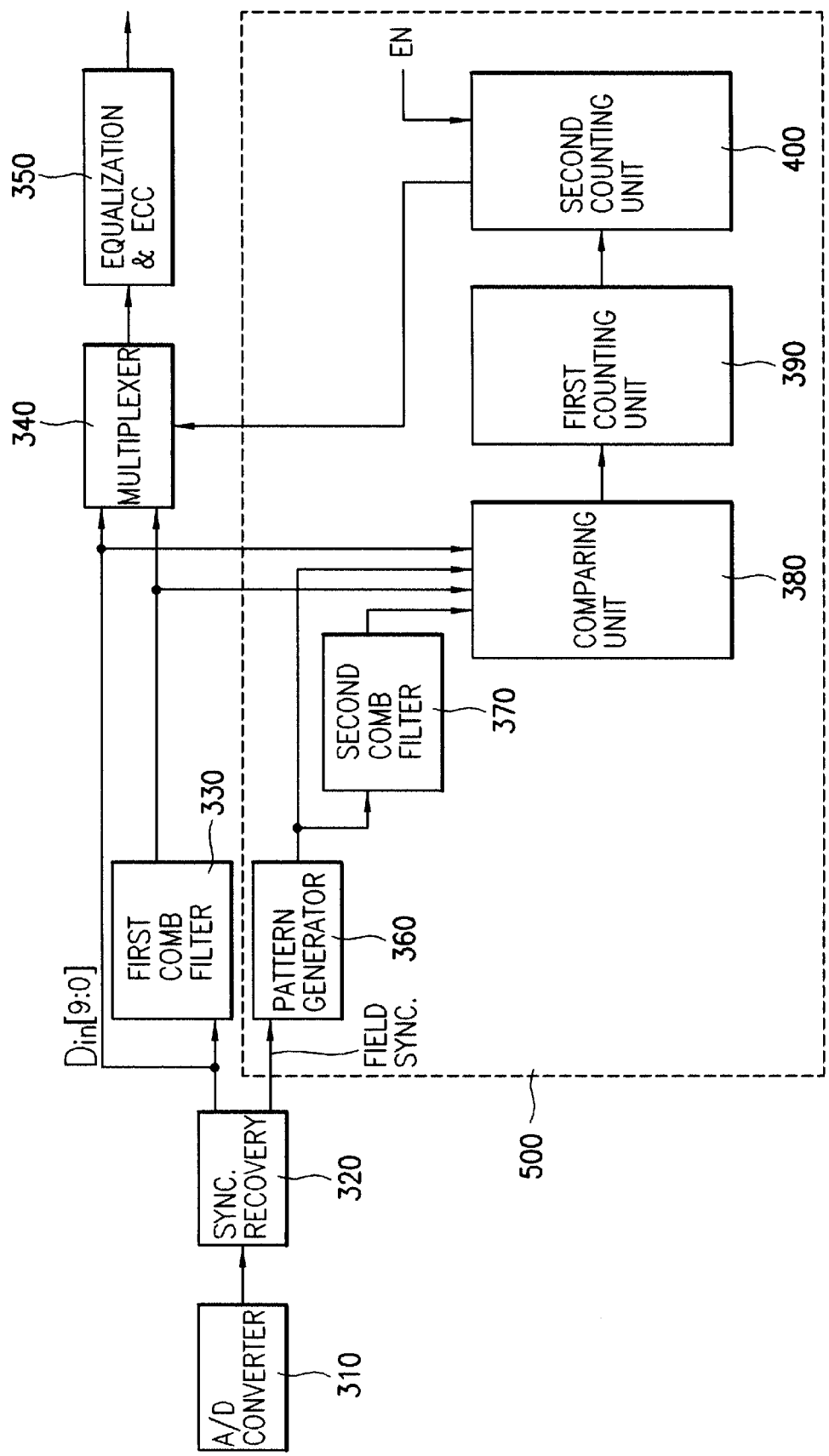
FIG. 2 is a block diagram of a DTV system for determining co-channel interference according to the present invention.

FIG. 2 shows a general DTV system according to the present invention including an A/D converter 310 converting an input signal into a digital signal of a given bit number; a sync recovery 320 recovering sync signals from the digital data; a first comb filter 330 removing co-channel NTSC interference from the digital data; a multiplexer 340 selectively outputting one of either the comb filtered data or the data that has not passed through the comb filter 330 in response to a selection signal; a determination unit 500 determining whether co-channel NTSC interference exists in the data and producing the selection signal to multiplexer 340 according to a result of the determination; and an equalization & ECC unit 350 equalizing the data from the multiplexer 340 and correcting an error in the equalized data.

The determination unit 500 includes a pattern generator 360 generating a pseudo random sequence pattern of a reference data field signal, i.e. the predetermined PN511 symbols, upon receiving a data field signal from sync recovery unit 320; a second comb filter 370 making a reference comb filtered signal from the reference data field signal; a comparing unit 380 finding a difference between a mean square error (MSE) of the comb filtered data field and reference data field signals, finding a difference between a MSE of the data field and reference data field signals that have not passed through a comb filter, and outputting a signal corresponding to the size of a noise by comparing the two MSES; a first counting unit 390 reset for each field and counting up or down in response to a result of the comparing unit 380; and a second counting unit 400 counting the reliability of the value of the first counting unit 390 and sending a selection signal corresponding to the counting result to the multiplexer 340. If the two MSEs are similar, the second counting unit 400 produces a signal selecting the comb filtered data.

Figure 3:
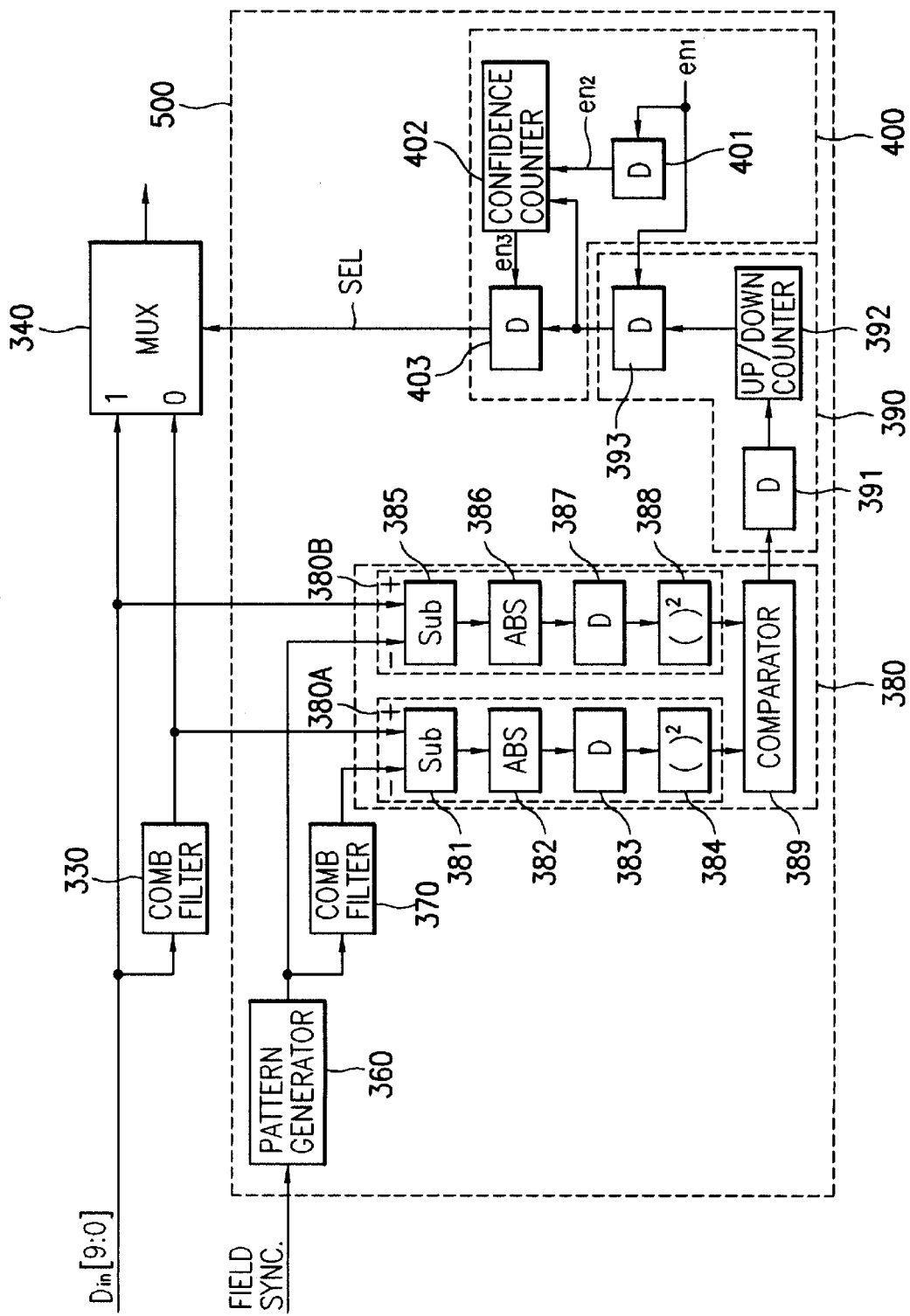
FIG. 3 is a block diagram of the comparing unit in FIG. 2.

FIG. 3 shows a detailed block diagram of comparing unit 380 of FIG. 2 including a first MSE generator 380A and a second MSE generator 380B. The first MSE generator 380A includes a subtracter 381 finding a difference between the data field signal from the comb filter 330 and a reference data field signal from the comb filter 370; an absolute value operating unit 382 finding an absolute value of the output from the subtracter 381; a D flip-flop 383 performing timing alignment with respect to the output from the absolute value operating unit 382; and a square operating unit 384 squaring the time-aligned absolute value to output a first MSE.

The second MSE generator 380B includes a subtracter 385 finding a difference between the data field signal and the reference data field signal, an absolute value operating unit 386 finding an absolute value of the output from the subtracter 385, a D flip-flop 387 performing timing alignment with respect to the output from the absolute value operating unit 386, and a square operating unit 388 squaring the time-aligned absolute value to output a second MSE. A comparator 389 compares the size of the two MSEs produced from the square operating units 384 and 388, and produces a signal corresponding to the size of the noise.

Also referring to FIG. 3, the first counting unit 390 includes a D flip-flop 391 performing timing alignment with respect to output from the comparing unit 380; an up/down counter 392 which is reset for each field to perform an up/down counting in response to a value of data output from the D flip-flop 391; and a D flip-flop 393 storing the a predetermined bit of data produced from the up/down counter 392 according to an external enable signal en1.

The second counting unit 400 includes a D flip-flop 401 generating an enable signal en2 one clock period later than the enable signal en1; a confidence counter 402 activated by the enable signal en2 from the D flip-flop 401, inspecting the reliability of the output signal of the D flip-flop 393 and producing an enable signal en3 if the reliability has a maximum or minimum value; and a D flip-flop 403 activated by the enable signal en3. The D flip-flop 403 temporarily delays the signal output by the D flip-flop 393 and outputs the signal as a selection signal se1 to multiplexer 340 upon being activated by the enable signal en3.

The operation of comparing unit 380 and the counting units 390, 400 will discussed next. For purposes of the illustration, it will be assumed that the A/D converter 310 converted the input signal into a digital data of 10 bits. Accordingly, the 10-bit digital data Din [9:0] is directly output to the multiplexer 340 and to the comb filter 330. The comb filter 330 removes the NTSC elements from Din [9:0] and outputs the filtered data to the multiplexer 340.

The multiplexer 340 either directly outputs the 10-bit digital data in response to selection signal sel or outputs the comb filtered data from the comb filter 330. The multiplexer 340 outputs the comb filtered data if NTSC channel interference exists, and otherwise, outputs data that has not passed through the comb filter 330. As discussed above, the determination unit 500 determines whether or not NTSC channel interference exists and sends a selection signal sel to the multiplexer 340.

Particularly, determination as to whether a co-channel NTSC interference exists may be made utilizing the data field signal which has a predetermined sequence of symbols. The data field signal is one data segment length including the segment data signal pattern of four symbols; the pseudo random sequence PN511, PN63, PN63, and PN63; the VSB mode information of 24 symbols; and a reserved region. The power level of the data field signal received from the transmitter is mapped to a digit '1' for a level of '120' and to a digit '0' for a level of '−120.' The data field signal would consist of only the two power levels in the absence of noise.

Accordingly, the pattern generator 360 may produce the pattern of data field signal upon receiving the data field signal. In the preferred embodiment of the present invention, the PN511 symbols are utilized in the determining whether co-channel NTSC interference exist. Accordingly, the pattern generator 360 generates a predetermined pattern of PN511 symbols.

After the generation of the reference data field signal pattern, the subtracter 385 of the second MSE generator 380B subtracts the reference data field signal pattern from the data field signal pattern contained in the data received through the sync recovery unit 320 of FIG. 2. The data field signal received through the sync recovery unit 320 contains noise added to the predetermined data field signal of the channel. This noise may include co-channel NTSC interference.

The output signal of the subtracter 385 is essentially the noise remaining after the removal of the data field signal. Because the value may be positive or negative, the absolute value operating unit 386 obtains an absolute value of output from the subtracter 385 and performs timing alignment with respect to the absolute value through the D flip-flop 387. The square operating unit 388 squares the time-aligned absolute value to differentiate the noise. The output of the square operating unit 388 is input to one input terminal of the comparator 389 as an MSE of the noise.

The data containing the data field signal is also filtered in the comb filter 330 to remove the co-channel NTSC interference. The output signals of the two comb filters 330 and 370 are input to the subtracter 381 of first MSE generator 380A, which subtracts the filtered reference data field pattern from the data field signal pattern. Because the co-channel NTSC interference has already been removed, the output of the subtracter 381 is essentially the Gaussian noise remaining after the removal of the data field signal. The power level added by the Gaussian noise may be doubled after passing through the comb filter 330.

Analogous to the second MSE generator 380B, the output of the subtracter 381 is changed to an absolute value by the absolute value operating unit 382 and time-aligned with respect to the absolute value through the D flip-flop 383. The square operating unit 384 squares the time-aligned absolute value and inputs the value to a second input terminal of the comparator 389 as a second MSE of the noise.

The comparator 389 determines whether co-channel NTSC interference exists by comparing the outputs of the square operating units 384 and 388. If there is no co-channel NTSC interference, the output of the square operating unit 384 would be larger than the output of the square operating unit 388. This is because the Gaussian noise doubles after passing the comb filter 330. On the other hand, if there is co-channel NTSC interference, the output of the square operating unit 388 would be larger than the output of the square operating unit 384. The reason being that the co-channel NTSC interference is still larger than the Gaussian noise even if the Gaussian noise were to be doubled.

The comparator 389 transmits the result to the up/down counter 392 after a timing alignment through the D flip-flop 391 of the first counting unit 390. The first counting unit 390 is used to prevent a Gaussian noise with large instantaneous value from being mistaken for co-channel NTSC interference when there is no co-channel NTSC interference. The up/down counter 392 is reset for each field, i.e. at the initial stage of each data field signal when the PN511 symbols of the data field signal begins.

When the results of the comparator 389 indicate that the MSE of the noise that passed through the comb filter 330 is larger than the MSE of the noise that has not passed through the filter 330, the up/down counter 392 considers that there is no co-channel NTSC interference and counts down by one value. When the MSE of the noise that passed through the comb filter 330 is smaller than the MSE of the noise that has not passed through the filter 330, the up/down counter 392 considers that there is a co-channel NTSC interference and counts up by one value.

In the preferred embodiment, the up/down counter 392 counts for 511 symbols, and as a result an occasional instantaneous surge of the Gaussian noise does not affect the overall determination of whether co-channel NTSC interference exists. When up/down counter 392 counts for 511 symbols, the count value increases if there is a co-channel NTSC interference and the count value decreases if there is no co-channel NTSC interference. Depending on the count value, the up/down counter 392 outputs a predetermined bit to the D flip-flop 393. Particularly, if there is co-channel NTSC interference, the up/down counter 392 outputs a "0", and otherwise outputs a "1".

The up/down counter 392 produces an output signal to the confidence counter 402 and flip-flop 403 of the second counting unit 400 through the D flip-flop 393. If the two MSEs received by the comparator 389 are close in size, the up/down counter 392 would produce both "0" and "1" repeatedly for each data field signal. As a result, the multiplexer 340 would alternately output data that has and has not passed through the comb filter 330, which adversely affects the operation of the equalization and ECC unit 350. In order to accommodate this circumstance, the second counting unit 400 is utilized.

The confidence counter 402 of second counting unit 400 is enabled 1-clock period later than the D flip-flop 393 of the first counting unit 390 by the D flip-flop 401. Thus, when the confidence counter 402 is enabled, the data stored in the D flip-flop 393 is input to the confidence counter 402.

The confidence counter 402 determines that there is no co-channel NTSC interference if the MSE of the noise that passed through the comb filter 330 is larger than the MSE of the noise that has not passed through the filter. Namely, if "1" is output from the first counting unit 390, the confidence counter 402 decreases the reliability by one step. If the MSE of the noise that passed through comb filter 330 is smaller than the MSE of the noise that has not passed through comb filter 330, the confidence counter 402 determines that there is co-channel NTSC interference. Namely if "0" is output from the first counting unit 390, the confidence counter 402 increases the reliability by at least two steps rather than one.

For example, assume that the MSE of the noise that passed the comb filter 330 alternatively is smaller and greater than the MSE of the noise that has not passed through the comb filter 330, and assume the reliability stored in the confidence counter 402 is "0." Also, assume that the increment of the reliability of confidence counter 402 is "16" and the decrement is "−1".

If the MSE of the noise that passed through the comb filter 330 is smaller than the MSE of the noise that has not passed through the comb filter 330, the D flip-flop 393 produces "0" and the reliability of the confidence counter 402 becomes "16". If the MSE of the noise that has not passed through the comb filter 330 is smaller than the MSE of the noise that passed through the comb filter 330, the D flip-flop 393 produces "1" and the reliability of the confidence counter 402 is decreased by "1" with a stored value equaling "15." If the MSE of the noise that passed through the comb filter 330 is again smaller than the MSE of the noise that has not passed through the comb filter 330 in the next data field signal section, the D flip-flop 393 produces "0" and the reliability of confidence counter 402 is increased by "16" to a value of "31".

The reliability of the confidence counter 402 in the next successive data field signal sections would be reduced to "30," "46," "45," and so forth. Accordingly, the reliability stored in the confidence counter 402 keeps on increasing and when the count value of the confidence counter 402 reaches a predetermined value, the confidence counter 402 enables the D flip-flop 403. Once the confidence counter 402 reaches the predetermined value, the confidence counter 402 continues to output the enable signal en3 to the D flip-flop, even if the MSE of the noise that has not passed comb filter 330 were to diminish such that the reliability of the confidence counter 402 becomes "0."

When the DTV system is reset by either turning on the power or changing a channel, the flip-flop 403 would not have a correct information on whether co-channel NTSC interference exists. Thus, the D flip-flop 403 stores a "1" as an initial default value corresponding to a signal selecting data that has not passed through the comb filter 330. The value of "1" is stored until the D flip-flop receives an enable signal en3 from the confidence counter 402. Upon receiving the enable signal en3, the output signal from the D flip-flop 393 is stored and sent to the multiplexer 340.

If the count value of confidence counter 402 is below a predetermined number, for example "0," and the enable signal en3 is received, the D flip-flop 403 would store "1" and send a selection signal to the multiplexer 340 to select the data that has not passed through the comb filter 330. If the counted value of confidence counter 402 is greater than the predetermined number, for example "127," and the enable signal en3 is received, the D flip-flop 403 would store "0" and send a selection signal to the multiplexer 340 to select the data that passed through the comb filter 330.

As a result, even if the size of the co-channel NTSC interference and the Gaussian noise is similar producing a similar MSE values, after a given time period elapses, the reliability of the confidence counter 402 becomes a high value and the D flip-flop 403 outputs a "0" to the multiplexer 340. Therefore, when the MSEs of the two noises input to the comparator 389 are similar, the multiplexer 340 selects and produces data that passed through the comb filter 330.

The apparatus and method for determining co-channel interference according to the present invention has the following advantages. First, the present invention utilizes an up/down counter to compare the MSEs of the noise that passed through the comb filter and the noise that has not passed through the filter to determine whether a co-channel NTSC interference exists. Thus, the up/down counter effectively prevents a Gaussian noise from being mistaken for a co-channel NTSC interference.

Second, utilizing an up/down counter rather than an integrator used in the related art simplifies the circuit design. Third, when the MSE of the noise that passed through the comb filter is larger than the MSE of the noise that has not passed through the comb filter, the reliability is decreased by one step, but when the MSE of the noise that passed through the comb filter is smaller than the MSE of the noise that has not passed through the comb filter, the confidence counter is designed to enhance the reliability by more than two steps.

When the reliability of the confidence counter reaches a predetermined maximum value, the data that passed through the comb filter is selected, and when the confidence counter reaches a minimum value, the data that has not passed through the comb filter is selected. Thus, when the MSE of the noise that passed through the comb filter is similar to the MSE of the noise that has not passed a filter, the data that passed through the comb filter is selected and output to the equalization & ECC unit 350. Accordingly, the present invention prevents a malfunction and enhances the system performance.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for determining co-channel NTSC interference, comprising:

a data processing circuit receiving input data, and outputting digital data and a data field signal of the digital data;

a pattern generator generating a reference data field signal from the data field signal of the digital data;

a comb filtering circuit filtering the data field signal and the reference data field signal;

a determination circuit comparing a first mean square error between the data field signal and the reference data field signal received from the comb filtering circuit with a second mean square error between the data field signal and the reference data field signal, said determination circuit determining the presence of co-channel interference utilizing the compared result of the first and the second mean square errors;

a selection circuit receiving the comb filtered digital data from the comb filtering circuit and the digital data from the data processing circuit, said selection circuit selecting and outputting one of either the comb filtered digital data or the digital data according to the determination of the determination circuit;

a first counting circuit counting up or down according to the determination of the determination circuit and depending upon the counted value, outputting a predetermined signal;

a second counting circuit receiving the predetermined signal and counting up or down a reliability count value according to the predetermined signal, said second counting circuit sending a selection signal to the selection circuit depending upon the reliability count value; and wherein the selection circuit receives the selection signal and selects one of either the comb filtered digital data or the digital data.

2. An apparatus of claim 1, wherein the pattern generator generates a pseudo random sequence pattern PN511 symbols of the data field signal.

3. An apparatus of claim 1, wherein the comb filtering circuit comprises:

a first comb filter filtering the digital data and the data field signal received from the data processing circuit; and a second comb filter filtering the reference data field signal received from the pattern generator.

4. An apparatus of claim 1, wherein the determination circuit comprises:

a first mean square error generator finding a first mean square error between the data field signal and the reference data field signal;

a second mean square error generator finding a second mean square error between the data field signal and the reference data field signal received from the comb filtering circuit; and a comparator comparing the first mean square error with the second mean square error, and determining the presence of co-channel NTSC interference utilizing the compared result of the first and the second mean square errors.

5. An apparatus of claim 4, wherein each of the first and the second mean square error generators comprises:

a subtracter finding a difference between the received data field signal and the reference data field signal;

an absolute operating circuit taking an absolute value of the difference output by the subtracter; and a square operating circuit squaring output of the absolute operating circuit.

6. An apparatus of claim 1, wherein the second counting circuit counts the reliability count value by a count-up value different from a count-down value.

7. An apparatus of claim 6, wherein one of either the count-up or count-down value is at least two, while the other count-down or count-up value is equivalent to one.

8. A method for determining co-channel NTSC interference comprising the steps of:

receiving an input data, and outputting digital data and a data field signal of the digital data;

generating a reference data field signal from the data field signal of the digital data;

comb filtering the data field signal and the reference data field signal;

comparing a first mean square error between the comb filtered data field signal and the comb filtered reference data field signal with a second mean square error between the data field signal and the reference data field signal;

determining the presence of co-channel NTSC interference utilizing the compared result of the first and the second mean square errors;

selecting and outputting one of either the comb filtered digital data or the digital data according to whether co-channel NTSC interference is present;

counting up or down a count value according to whether co-channel NTSC interference is present and outputting a predetermined signal depending upon the count value;

receiving the predetermined signal and counting up or down a reliability count value according to the predetermined signal, and sending a selection signal depending upon the reliability count value; and selecting one of either the comb filtered digital data or the digital data according to the received selection signal.

9. A method of claim 8, wherein in the step of generating the reference data field signal, generating a pseudo random sequence pattern PN511 symbols of the data field signal.

10. A method of claim 8, wherein the step of comb filtering further comprises the step of:

comb filtering the digital data and the data field signal; and comb filtering the reference data field signal.

11. A method of claim 8, wherein the determination step further comprises the steps of:

finding a first mean square error between the data field signal and the reference data field signal;

finding a second mean square error between the comb filtered data field signal and the comb filtered reference data field signal; and comparing the first mean square error with the second mean square error, and determining the presence of co-channel NTSC interference utilizing the compared result of the first and the second mean square errors.

12. A method of claim 8, wherein in the step of counting the reliability count value, a count-up value is different from a count-down value.

13. A method of claim 12, wherein one of either the count-up or count-down value is at least two, while the other count-down or count-up value is equivalent to one.

14. A DTV system comprising:

an antenna receiving input data signals;

a tuner selecting a signal of desired channel from the received data signals and changing the selected signal to an intermediate frequency signal;

a FPLL circuit demodulating the intermediate frequency signal into baseband signals I and Q, and locking the frequency and the phase of the intermediate frequency signal;

an A/D converting circuit converting the I signal into a digital signal of a given bit number;

a sync recovery circuit detecting a segment data signal and a data field signal from the digital data;

a pattern generator generating a reference data field signal utilizing a pseudo random sequence pattern PN511 symbols of the data field signal;

a comb filtering circuit filtering the data field signal and the reference data field signal;

a determination circuit comparing a first mean square error between the data field signal and the reference data field signal received from the comb filtering circuit with a second mean square error between the data field signal and the reference data field signal, said determination circuit determining the presence of a co-channel interference utilizing the compared result of the first and the second mean square errors;

a selection circuit receiving the comb filtered digital data from the comb filtering circuit and the digital data from the data processing circuit, said selection circuit selecting and outputting one of either the comb filtered digital data or the digital data according to a received selection signal;

a first counting circuit counting up or down according to the determination of the determination circuit and depending upon the counted value, outputting a predetermined signal;

a second counting circuit receiving the predetermined signal and counting up or down a reliability count value according to the predetermined signal, said second counting circuit sending a selection signal to the selection circuit depending upon the reliability count value;

a decoding circuit decoding the selected data output by the selection circuit using the segment data and data field signals; and a display visually presenting the decoded data.

* * * * *